No. 671,421.  
G. MERKLE.  
FISH DRESSING MACHINE.  
(Application filed Apr. 9, 1900.)  
(No Model.)  
Patented Apr. 2, 1901.  
2 Sheets—Sheet 1.
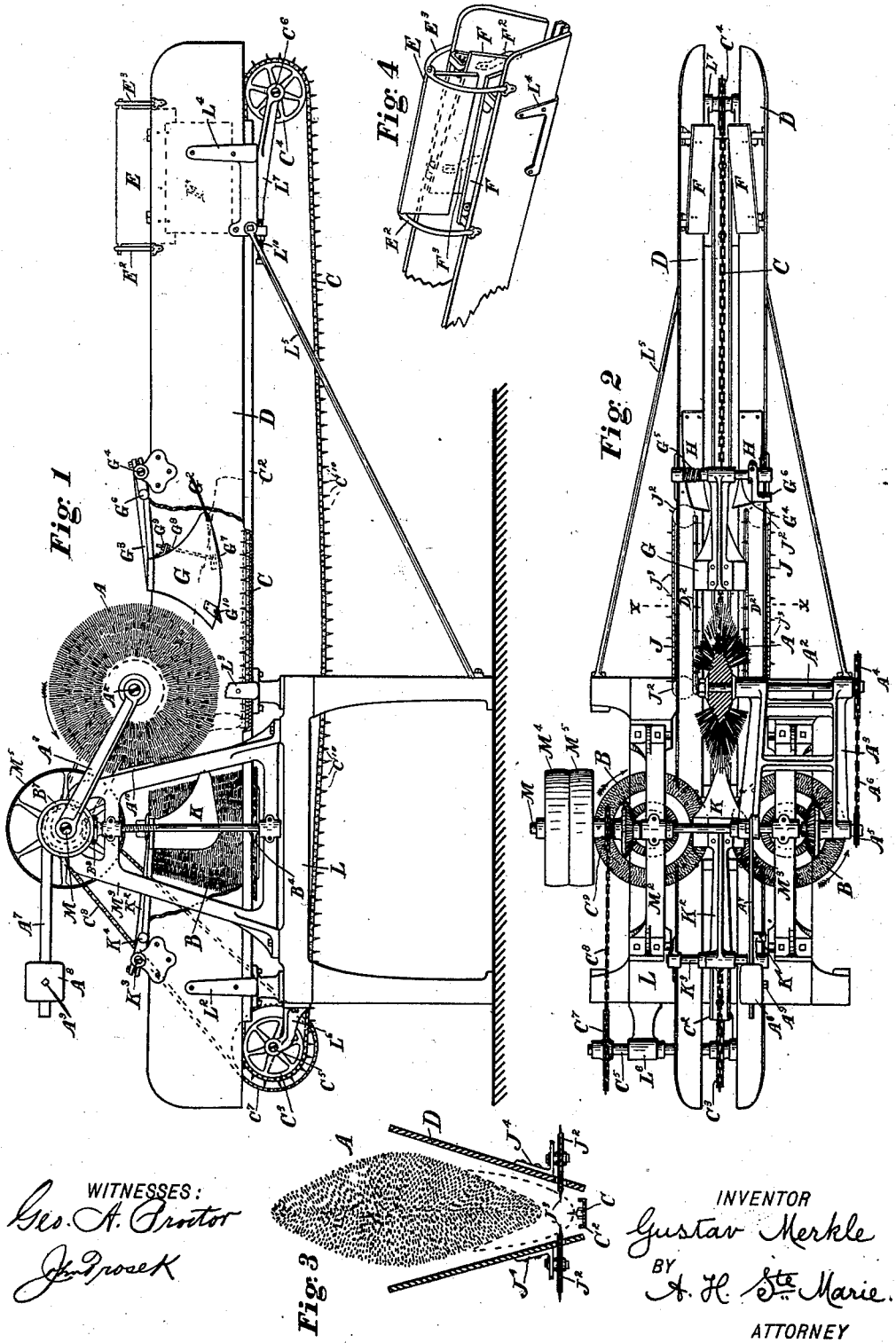
WITNESSES:  
INVENTOR  
Gustav Merkle  
BY  
A. H. Ste Marie.  
ATTORNEY No. 671,421. Patented Apr. 2, 1901.
G. MERKLE.
FISH DRESSING MACHINE.
(Application filed Apr. 9, 1900.)
(No Model.) 2 Sheets—Sheet 2.
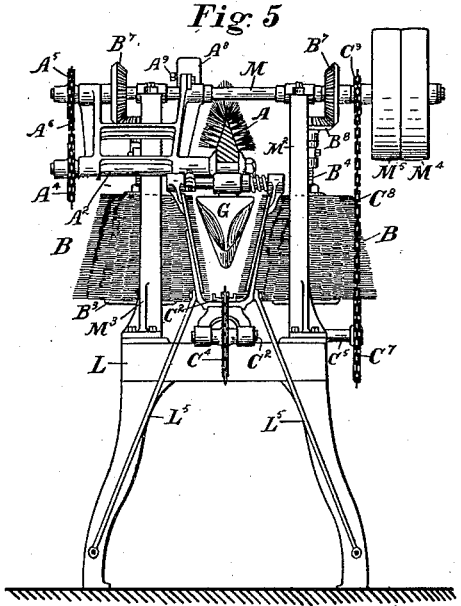
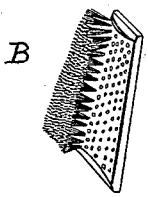
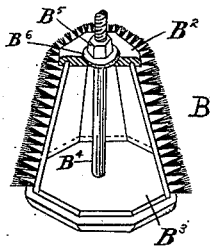
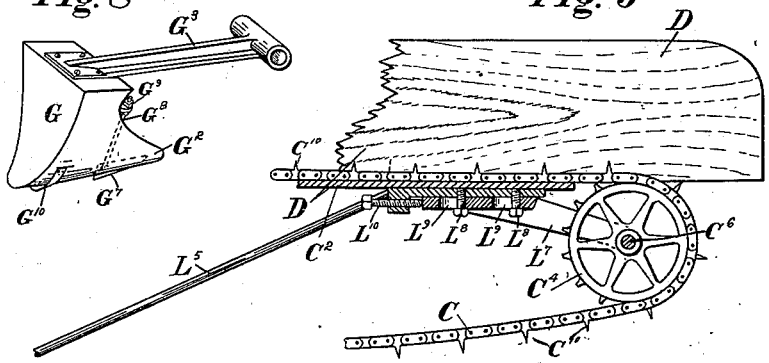
WITNESSES:
Geo. A. Proctor
John Prosek
INVENTOR
Gustav Merkle
BY
A. H. Ste Marie.
ATTORNEY

UNITED STATES PATENT OFFICE.

GUSTAV MERKLE, OF SAN FRANCISCO, CALIFORNIA.

FISH-DRESSING MACHINE.

SPECIFICATION forming part of Letters Patent No. 671,421, dated April 2, 1901.

Application filed April 9, 1900. Serial No. 12,236. (No model.)

*To all whom it may concern:*

Be it known that I, GUSTAV MERKLE, of the city and county of San Francisco, State of California, have invented a new and useful Machine for Cleaning Fish, of which the following is a specification.

This invention is devised to facilitate the cleaning of fish on a large scale, particularly salmon that is to be put up in hermetically-sealed cans. It is devised chiefly for the purpose of removing the slime, scales, and other extraneous substances from the interior and exterior of the fish, the separation of the heads, entrails, and fins being a heterogeneous operation effected by hand by the dexterous workman in a sufficiently expeditious manner to obviate the use of a separate contrivance or of complicating this machine by additional mechanism.

In the accompanying drawings, which form part of this specification, Figure 1 is a left-side elevation partly broken. Fig. 2 is a plan. Fig. 3 is a cross-section on the line $x\,x$ of Fig. 2 looking to the left. Fig. 4 is a detailed view in perspective of the front end of the machine. Fig. 5 is a front end view. Figs. 6 and 7 are perspectives showing details of some brushes with which the machine is provided. Fig. 8 is also a detailed perspective view showing one of the spreaders that are used in cleaning the fish. Fig. 9 is an enlarged view of the front end of the machine with the near side removed to show part of the fish-carrier and the means employed for adjusting the same. Fig. 10 is a perspective of a bracket pertaining to said carrier.

Similar parts are indicated by similar letters of reference throughout the specification and drawings.

Speaking in a general way, the invention comprises the following-named parts, to wit: a sliming-brush A, designed to clean the inside of the fish; scaling-brushes B, arranged so as to clean the fish on the outside; a carrier chain or belt C, that conveys the fish to and beyond the said sliming and scaling brushes; a trough, chute, or bed D for holding the fish in proper position on the carrier during the process of cleaning; a swinging plate E, that prevents the feeding or depositing of more than one fish at a time on the said carrier and bed; spring-pressed hinged guides F to insure the centering and longitudinal adjustment of fish of different sizes on the carrier-belt; a spreader G to open the fish preparatory to and while being subjected to the action of the sliming-brush; spring-plates H, guiding the fish into the right position for said spreader to enter; idle chains J, having prongs that sink into the sides of the fish and hold it down on the carrier against the lifting action of the brush A; a second spreader K, that keeps the sides of the fish out against the brushes B while its scales are being removed; actuating mechanism, and suitable supports and bearings, all as more fully hereinafter described.

The several parts of the machine are secured to and held at a convenient elevation by a frame or stand L.

The carrier C consists of a sprocket-chain or link belt arranged to run in a channel-iron guide $C^2$, that is secured to the bottom or lower member of substantially U-shaped straps $L^2\,L^3$, bolted on the frame L, and of a similarly-shaped strap $L^4$, supported by braces $L^5$ from said frame. This chain or belt passes around two vertically-disposed sprocket-wheels $C^3\,C^4$ at the opposite ends of said channel-iron guide—one, $C^3$, mounted on a shaft $C^5$, journaled in brackets $L^6$ at the rear end of the frame L, and the other, $C^4$, having its axle $C^6$ journaled in a bracket $L^7$, adjustably secured to the strap $L^4$ at the forward end of the machine. The latter-named bracket is attached to the base of the strap $L^4$ by bolts $L^8$, passing through slots $L^9$, provided in said bracket, and whose object is to allow it to be forced forward to move out the sprocket-wheel $C^4$, and thereby tighten or take up the slack in the carrier-chain, as required, which is done by means of a set-screw $L^{10}$ passing through a lip projecting downward from the base of the strap $L^4$, as seen in Fig. 9. The carrier is moved by a sprocket-wheel $C^7$ on the remote end of the shaft $C^5$, connected by chain $C^8$ with a similar wheel $C^9$ on the shaft M, which is the driving-shaft of the machine and is borne and boxed at the top of frames $M^2\,M^3$, bolted to the subframe or stand L, as shown in Figs. 1, 2, and 5. This shaft is provided at one end with the usual fast and loose pulleys $M^4\,M^5$. Points or prongs $C^{10}$ are attached to the outside of the carrier-chain, as best seen in Figs. 1 and 9. These points are placed at suitable distances apart—say six inches—and their function is to grasp the back of the fish and to hold it securely to the carrier-chain, and thus convey it onward to the brushes and thence off the machine, as the said chain courses along its channel-iron guide $C^2$.

The trough, chute, or bed D is composed of two side boards or sheet-iron plates set on edge, somewhat converging toward the bottom and secured to the U-shaped straps $L^2$ $L^3$ $L^4$, which extend across the bottom beneath the carrier-guide $C^2$, as previously described, and thence up and without the sides of the bed D both ways, the width and incline of these sides D being regulated according to the size and shape of the fish to be operated upon. As indicated by dotted lines in Figs. 1 and 3, the fish to be cleaned is cast, back downward, on the prongs of the carrier, within the bed D, which operation buries the said prongs into the back of the fish and causes it to adhere to the carrier, thus feeding it into the machine. This feeding-bed D has its forward end extending well to the front to give plenty of room to the workmen to feed the fish in rapid succession and to remove them from the swish and spray of the sliming-brush A.

At the forward end of the machine will be found the swinging plate E, hereinbefore mentioned as being provided for the purpose of regulating the feed so that but one fish can be dropped at a time into the feeding-bed D. This plate (shown in Figs. 1 and 4) is hung from bails $E^2$ $E^3$, placed across the upper part of the bed, and projects down into the center of it, at the feeding point, far enough to reach to either side upon being swung. It is displaced and swung by the fish cast into the bed in such a way that the men who attend to the feeding—two of whom are employed, one on each side of the machine—may not, through inadvertence or otherwise, drop their fish simultaneously into the bed, but must do so alternately, each in his turn.

To center the fish, so that it will lie straight on the carrier-belt and be caught by the prongs thereof on a line running directly along the middle of the back, I provide the guides F, consisting of two plates that are hinged to the upper edges of the feeding-bed D and, as represented in Figs. 2 and 4, are set obliquely in the bed in such a manner that they will pitch in and back to conform to the shape of the fish. These plates have springs $F^2$ $F^3$ attached to their under sides and bearing on the inner sides of the feeding-bed, which springs allow the said plates to spread apart to accommodate fish of different sizes. As it is fed onward by the carrier-chain toward the sliming-brush A the fish is brought to an abdomen-spreader G, suspended in the center of the feeding-bed D just in front of said brush and almost in contact with it. This spreader is somewhat wedge-shaped, with its thinner part downwardly disposed and having a projection $G^2$ running forwardly from the lower edge and gradually curving upward toward the main body of the spreader. The object of this construction is that the projection $G^2$ may enter the visceral cavity of the fish as near the dorsal line as practicable and gradually lift the abdominal walls of the fish and hold them against the sides of the bed D to admit of the free entry and action of the sliming-brush. This spreader G is seen in perspective at Fig. 8. It is held in its central position in the bed D, as shown in Figs. 1, 2, and 5, by a swinging arm $G^3$, which is pivoted on the shaft $G^4$ and held down by a tension-spring $G^5$. The height of the spreader-wedge above the carrier-chain is regulated by the stop $G^6$. At the bottom of the spreader G is provided a longitudinally-disposed and vertically-adjustable slitting-knife $G^7$, with sharp edge downward and with upper edge or back secured to a rod $G^8$, having at its upper end an adjusting thumb screw or nut $G^9$ to adjust the depth of said knife. The function of this knife $G^7$ is to expose to the sliming-brush a line of blood or pigment that subtends the vertebral column of the fish by slitting a superimposed membrane. Back of the knife $G^7$, on the lower edge of the spreader G, is a scraper $G^{10}$, which loosens the said line of blood or pigment and the membrane thereover preparatively to the same being rubbed off and taken up by the brush A.

Before reaching the spreader above described the fish is made to pass between two spring-plates H, Fig. 2, which are screwed on at their forward ends to the inner sides of the bed D and have their rear ends curved inward, as shown, to take up the fish, so it will be presented to the spreader in the right position for the spreader projection $G^2$ to enter it centrally.

The sliming-brush A is a disk-shaped rotary brush and is mounted on an arbor $A^2$ at the lower end of a counterweighted frame $A^3$, having its bearing on the main shaft M. It is centrally disposed with reference to the feeding-bed D and made to revolve rapidly in the direction of the approaching fish by means of the sprocket-wheels $A^4$ $A^5$ and chain $A^6$, that connect said arbor with said main shaft. It is shown in full in Figs. 1 and 3 and in section in Figs. 2 and 5. It is made, preferably, of wire bristles set within punctures or borings in the beveled sides and on the rim of a disk-shaped foundation of metal or tough hard wood tapering toward the rim, as shown. The sliming-brush frame $A^3$ has pivotal or hinge connection with the shaft M to admit of adjusting the said brush within the fish. The downward pressure of the brush A is regulated by means of the opposing lever or bar $A^7$, which is rigidly continuous with the sides of the brush-frame $A^3$ and carries the weight $A^8$. The weight $A^8$ is slidable on the lever $A^7$ and is held in position thereon by the set-screw A⁹. The brush-frame is also limited in its downward movement by the stop A¹⁰.

To prevent the revolving brush A from lifting the fish off the carrier, I provide a pair of idle chains J, which pass around horizontally-disposed sprocket-wheels J², projecting through slots D² in opposite sides of the feeding-bed D, and have points or prongs J³, that sink into the sides of the fish as it passes by on the carrier-chain and operate to keep it down on the points or prongs C¹⁰, with which said chain is provided. The sprocket-wheels J² are held up by brackets J⁴ on the sides of the feeding-bed, as shown in Fig. 3.

After leaving the brush A the fish is carried upon a second spreader K, similar to the spreader G and situated directly between the scaling-brushes B. This spreader is provided for keeping the abdominal walls of the fish against the said scaling-brushes at the point where each scaling-brush comes in contact with the exterior surface of the body of the fish. Like the spreader G, the spreader K has a vertical hinge action, being fastened to a swinging arm K², pivotally connected with a shaft K³, placed across the top of the bed D. Its depth is adjusted by the stop K⁴.

The scaling-brushes B are preferably segmental and in shape the frustum of a cone. One of these segmental brushes is seen in sectional perspective in Fig. 7 with three of the segments removed. One segment is seen in perspective at Fig. 6, showing by a dotted portion some bristles removed, so as to illustrate its construction. These bristles are made of wire, preferably. The several segments have a foundation of tough hard wood and are arranged at their top and bottom ends to fit tightly within corresponding grooves or mortises in the head-plate B² and the base-plate B³, respectively, as seen in Fig. 7. These segments and plates are clamped together on a vertical shaft B⁴ by means of the nut and washer B⁵ B⁶. The segment Fig. 6 is plano-convex, and Fig. 7 illustrates a brush of eight such segments conical without and pyramidal within. The said scaling-brushes are arranged one on each side of the carrier-chain within cut-away portions of the bed D and at a suitable distance apart to admit of a fish of the ordinary size for which the machine is intended passing tightly between them while being conveyed on the carrier-chain. They are secured centrally to their vertically-disposed shafts B⁴, each to each, and placed with their wider end downward in the frames M² M³, on the sides of which the said shafts B⁴ have their bearings, as best seen in Fig. 1. These vertical shafts B⁴ and their scaling-brushes secured thereon are operated from the main shaft M through the agency of bevel-gears B⁷ B⁸, which are oppositely disposed, so that the scaling-brushes may revolve in opposite directions for scaling the opposite sides of the intermoving fish. It is intended to feed the fish head end foremost. Therefore these scaling-brushes will revolve in the same direction with the fish, but sufficiently faster to enable the bristles of each brush to lift and remove the scales of the passing fish. Both brushes B are adjustable laterally to regulate their pressure on the fish and to compensate for wear in the brushes. They are adjusted by moving their supporting-frames M² M³ toward each other, which is done by sliding the bolts thereof in suitable slots in the under frame L in a well-known manner. Having passed the scaling-brushes, the fish are thrown off the machine and gathered in any convenient receptacle or else discharged into an elevator that carries them to the cutters' tables.

What I claim, and desire to secure by Letters Patent of the United States, is—

1. In a fish-cleaning machine, the combination of a guide-bed, a longitudinally-movable carrier, scaling-brushes arranged on opposite sides of said carrier, and a spreader arranged in the path of the fish and acting to hold the fish sides out against the said scaling-brushes, substantially as described.

2. In a fish-cleaning machine, the combination of a substantially V-shaped guide-bed, a longitudinally-movable carrier in the bottom of said bed, rotary scaling-brushes at opposite sides of said bed and projecting thereinto, and a spreader between the sides of said bed above said carrier and acting to hold the fish sides out against said scaling-brushes, substantially as described.

3. A pair of oppositely-disposed conical brushes, means for passing the fish therebetween, and means for spreading the fish and holding its sides out against the brushes as it passes the same.

4. In a fish-cleaning machine, the combination of a guide-bed, a pronged carrier for taking hold of the back of the fish, a rotary sliming-brush opposite said carrier and acting to clean the inside of the fish, and pronged holding-chains adjacent to said brush and adapted to take hold of the sides of the fish and prevent the brush from lifting the fish off the carrier, substantially as described.

5. A carrier chain or belt, a guide therefor, a feeding bed, chute, or trough with sides sloping down toward said carrier chain or belt, a spreader and sliming-brush yieldably supported within the feeding bed, chute, or trough above the carrier, scaling-brushes entering the sides of the feeding bed, chute, or trough on opposite sides of the carrier, and a spreader between said scaling-brushes.

6. In a fish-cleaning machine, a trough-shaped feeding-bed, a carrier therein, and a longitudinally-disposed plate arranged to swing from a point above the center of the bed to either side thereof at the feeding-point.

7. In a fish-cleaning machine, a carrier, a sliming-brush, a spreader in front of said brush, and oppositely-arranged spring-plates in front of said spreader and arranged to hold the fish on their backs on the carrier and present them centrally to the spreader, substantially as described.

8. In a fish-cleaning machine, the combination of a feeding-trough, a carrier in the bottom of the trough, a spreader above the carrier, a sliming-brush above the carrier in rear of the spreader, opposite scaling-brushes operating in the trough, and a spreader above the carrier between said scaling-brushes, substantially as described.

9. In a fish-cleaning machine, the combination of a yieldably-supported wedge-shaped spreader, a knife carried thereby, and means for carrying the fish past said spreader and knife, substantially as described.

10. In a fish-cleaning machine, the combination of a substantially V-shaped trough, a carrier in the bottom thereof, opposite spring-pressed plates F in said trough at the feed end, and longitudinal swinging plate E above and between the plates F, substantially as described.

11. In a fish-cleaning machine, the combination of means for carrying the fish, a sliming-brush in the path of the fish for cleaning the inside of the fish, scaling-brushes between which the fish is carried, and spreading means for holding the fish distended while said scaling-brushes are operating thereon, substantially as described.

12. In a fish-cleaning machine, the combination of a carrier, a sliming-brush, a spreader in advance of said brush and in the path of the fish, and spring-plates arranged on opposite sides of the carrier to present the fish centrally to the spreader, substantially as described.

13. In a fish-cleaning machine, the combination of a carrier for the fish, a spreader acting to open the fish as it is brought by said carrier, a sliming-brush, and obliquely-disposed yieldable devices operating to center and adjust the fish lengthwise on the carrier, substantially as described.

Signed by me at San Francisco, California, this 24th day of March, 1900.

GUSTAV MERKLE. [L. S.]

Witnesses:
A. H. STE MARIE,
CHAS. T. STANLEY.